United States Patent
Curtis

[11] Patent Number: 6,089,083
[45] Date of Patent: Jul. 18, 2000

[54] TIRE INSPECTION AND PREPARATION DEVICE

[76] Inventor: John Michael Curtis, R. D. #1, Box 227J, Cowansville, Pa. 16218

[21] Appl. No.: 08/916,394

[22] Filed: Aug. 22, 1997

[51] Int. Cl.[7] .................................................... G01M 17/02
[52] U.S. Cl. ............................................................. 73/146
[58] Field of Search .............................. 73/8, 104, 105, 73/146, 487

[56] References Cited

U.S. PATENT DOCUMENTS

| | | |
|---|---|---|
| 1,327,216 | 1/1920 | Rouanet . |
| 2,408,746 | 10/1946 | Evert . |
| 3,899,917 | 8/1975 | Kisbany ........................................ 73/8 |
| 3,986,267 | 10/1976 | Taylor . |
| 4,160,329 | 7/1979 | Scrimshaw . |
| 4,268,968 | 5/1981 | Przybylinski et al. . |
| 4,348,891 | 9/1982 | Stickler et al. ............................ 73/146 |
| 4,404,848 | 9/1983 | Iwama et al. .............................. 73/146 |
| 4,700,484 | 10/1987 | Frank et al. . |
| 4,969,355 | 11/1990 | Doi et al. ................................... 73/146 |
| 5,022,267 | 6/1991 | Shattuck et al. . |
| 5,107,703 | 4/1992 | Ota ................................................ 73/8 |
| 5,197,200 | 3/1993 | Bahr et al. . |
| 5,313,827 | 5/1994 | Yovichin ................................... 73/146 |
| 5,448,910 | 9/1995 | Yurjevich et al. ......................... 73/146 |
| 5,460,036 | 10/1995 | Church ....................................... 73/146 |
| 5,777,219 | 7/1998 | Popio et al. ............................... 73/146 |
| 5,789,668 | 8/1998 | Coe et al. .................................. 73/146 |

*Primary Examiner*—Eric S. McCall
*Attorney, Agent, or Firm*—Aileen Champion Addessi

[57] ABSTRACT

A tire inspection and preparation device for automobile racing tires is a self contained unit which can be conveniently transported and used at a race track or other location for measuring the circumference, run out, and wear of an automobile tire or for preparing the surface of the tire. The tire inspection and preparation device includes a mount having a rotatable member for rotating the tire while supported by the mount. The mount further includes an elongated member for elevating the tire above the ground. Leveling pads can be used to adjust the position of the tire for substantially balancing the tire for providing accurate measurements. Several tools may be interchangeably attached to the mount and used for performing several tasks, such as a contact wheel and encoder for accurately measuring circumference, a dial indicator for measuring run out, or a preparation tool for cleaning debris from the tire or scuffing the surface of the tire. A motor can be connected to the rotatable member and to the preparation tool for automating and improving the efficiency of the process.

20 Claims, 6 Drawing Sheets

TIRE INSPECTION AND PREPARATION DEVICE

BACKGROUND OF THE INVENTION

The invention relates to automobile racing and, more particularly, to a device for measuring the circumference of a tire, monitoring the run out of the tire, cleaning debris from the tire, or scuffing the surface of the tire.

During automobile racing, the tires of a racing car are continuously checked for variations in dimensions due to changes in temperature, pressure, the condition of the race track, or other conditions.

Some automobile racing crews manually check the circumference of the tires by wrapping a tape measure around the tire. Due to various conditions of a race track, debris is removed from the tire by hand using a scraper tool, and the surface of the tire is roughed up by hand using a wire brush or grinder.

There are several kinds of devices for measuring diameter of objects. One such device is disclosed in U.S. Pat. No. 4,700,484 to Frank et al. The diameter measuring device includes a wheel for contacting an object, an encoder and a microprocessor for calculating the diameter of the object. However, the measuring device is for use with a lathe for rotating the object to be measured and does not include means for rotating the object.

U.S. Pat. No. 5,197,200 to Bahr et al. discloses a measuring device having a contact wheel and two support arms. However, the measuring device is for use on a cylinder positioned in a roll grinding machine and does not have a rotation means for the cylinder.

Therefore, what is needed is an apparatus for inspecting and preparing automobile tires which is transportable, including an attached mounting means for the automobile tire, and which includes an accurate and convenient means for measuring and/or preparing the tire.

SUMMARY OF THE INVENTION

A tire inspection and preparation device includes a mount having an elongated member for supporting a tire in spaced apart relation to a support surface, a rotatable member rotatably attached to the elongated member for rotating the tire about an axis, and a fastener coupled to the rotatable member for securing the tire to the mount. A support arm is attached to the mount and includes a first arm adjustably attached to the mount and extending substantially perpendicular to the elongated member, and a second arm adjustably attached to the first arm and extending substantially perpendicular to the first arm. At least one tool is interchangeably attached to the second arm for contacting the tire.

One embodiment includes the tool being a contact wheel. The tool includes a bracket attached to the second arm and having a reference marking for alignment with a reference marking on the tire for determining a revolution of the tire. An encoder is attached to the wheel for measuring rotation of the wheel and producing a signal, and a counter is electrically connected to the encoder for receiving the signal from the encoder and determining a circumference of the tire.

As an alternative to the use of the contact wheel, a dial indicator may be attached to the bracket for contacting the tire for measuring run out of the tire and wear of the tire.

As another alternative, a preparation tool may be attached to the support arm for removing debris from the tire or scuffing the surface of the tire. A first motor may be coupled to the mount for automatically rotating the tire and a second motor may be coupled to the tool for rotating the tool.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

Figure 1:
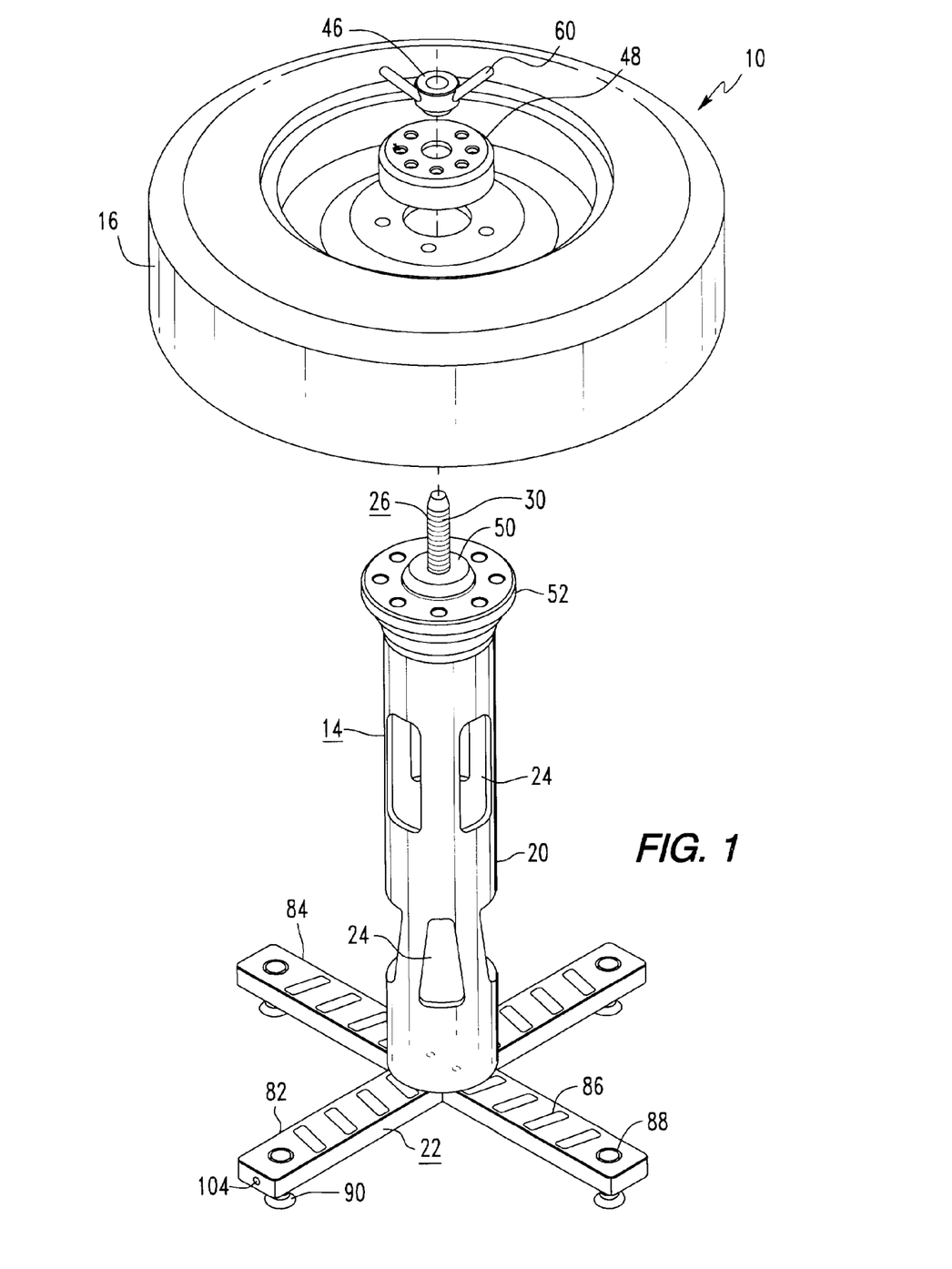
FIG. 1 is a partially exploded isometric view of a tire inspection and preparation device.
Figure 2:
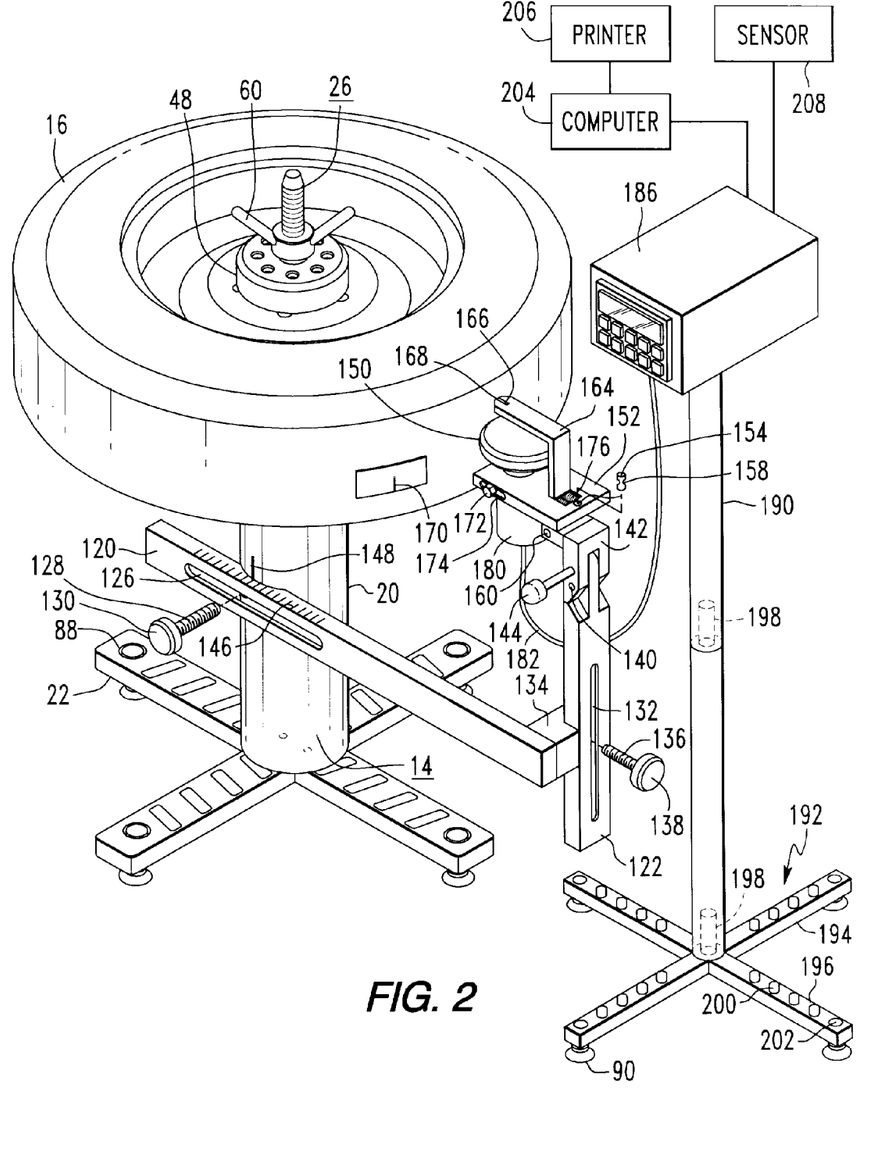
FIG. 2 is an isometric view of the tire inspection and preparation device showing a wheel assembly contacting a tire.
Figure 3:
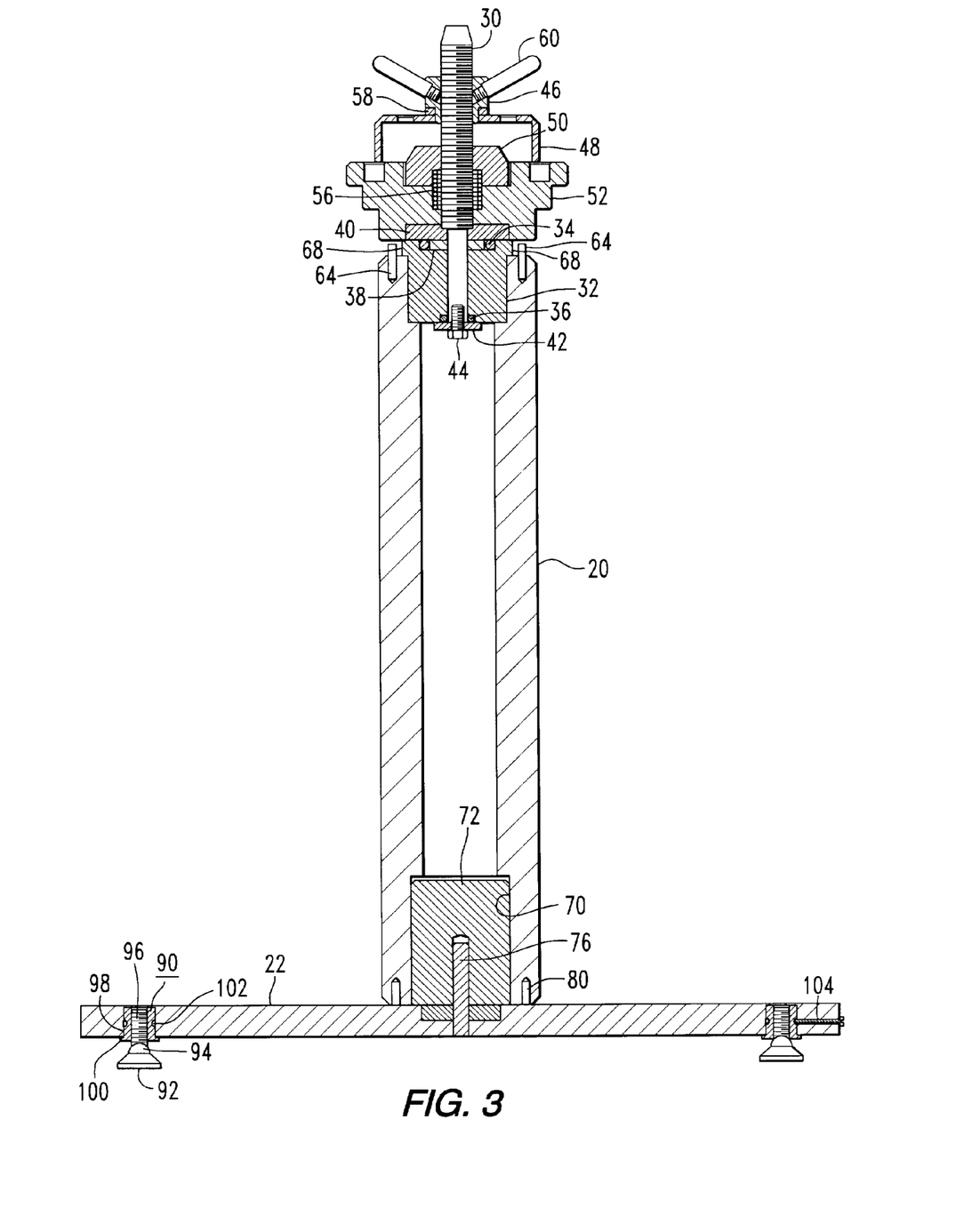
FIG. 3 is a cross-sectional view of the tire inspection and preparation device.

Referring to FIGS. 1–3, a tire inspection and preparation device 10 is transportable and self contained for enabling the tire inspection and preparation device 10 to be used on tires at a race track. The tire inspection and preparation device 10 includes a mount 14 for supporting and rotating a tire 16 during measuring or repairing the tire 16. The mount 14 includes an elongated member 20 attached to a base 22 for elevating the tire 16 above a support surface, such as the ground. The elongated member 20 has several openings 24 disposed therethrough for reducing the overall weight of the tire inspection and preparation device 10.

The mount 14 further includes a rotatable member 26 for enabling the tire 16 to rotate with respect to the elongated member 20 and the ground. The rotatable member 26 includes a threaded shaft 30 disposed within a bearing housing 32, which contains a bearing 34 and a bearing 36 for rotational movement of the threaded shaft 30. A bearing spacer 38 is disposed between the bearing 34 and the threaded shaft 30. A backplate 40 retains the bearing 34 and a bearing cap 42 retains the bearing 36 within the bearing housing 32. A bolt 44 or other fastener secures the bearing cap 42 to the threaded shaft 30.

The threaded shaft 30 is threadedly engaged with a fastener, such as a lock nut 46. Positioned between the lock nut 46 and the bearing housing 32 and disposed on the threaded shaft 30 is a cap 48, a tire cone 50, and a tire base 52. The tire 16 is positioned between the cap 48 and the tire cone 50 and rests on the tire base 52. By tightening the lock nut 46 against the cap 48 enables the components of the rotatable member 26 to rotate as a unit within the elongated member 20.

A spring 56 is disposed on the threaded shaft 30 and is positioned between the tire cone 50 and the tire base 52 for absorbing vibration or impact. A spacer 58 is positioned between the lock nut 46 and the cap 48. A pair of handles 60 are attached to the lock nut 46 for enabling a person to grasp the handles 60 to tighten the lock nut 46.

By positioning the tire 16 within the rotatable member 26 and enabling the tire 16 to rotate as a unit with the rotatable member 26, the tire is securely supported by the mount and evenly balanced for providing accurate measurements of the tire 16 during inspection and preparation. The tire 16 rotates about an axis extending longitudinally through the elongated member 20.

The bearing housing 32 is positioned within a recess 62 of the elongated member 20 and is held in a stationary position by a pair of pins 64 attached to the elongated member 20 and engagable with recesses 68 in the bearing housing 32.

The elongated member 20 has a second recess 70 positioned at an opposite end of the elongated member 20 as the recess 62 for positioning of a base plug 72 The base plug 72 has a bore for insertion of a dowel pin 76, which is also inserted into a bore in the base 22. Pins 80 are inserted into bores in the elongated member 20 and into bores in the base 22 for preventing rotational movement of the elongated member 20.

The base 22 includes a first member 82 and a second member 84, which is positioned substantially perpendicular to the first member 82 for stabilizing the tire inspection and preparation device 10. The base 22 has a plurality of openings 86 for reducing the overall weight of the tire inspection and preparation device 10.

A bore 88 is positioned at each end of the first and second members 82 and 84 for insertion of a leveling pad 90. The leveling pad 90 has a base 92 for resting on the support surface, which is attached to a pivot 94, for enabling the base 92 to pivot with respect to the first and second members 82 and 84 to compensate for uneven support surfaces for positioning the tire 16 in a substantially level position The pivot 94 is attached to a threaded rod 96, which is threadedly attached to a bushing 98, for adjusting the position of the base 92 with respect to the first and second members 82 and 84. The bushing 98 includes a flange 100 which has a diameter larger than the diameter of the bore 88 for supporting the base 22. The bushing 98 has a recess 102 for engagement with a ball set screw 104 positioned in the base 22 for retaining the bushing 98 within the bore 88, for example, when the base 22 is lifted above the support surface.

A support arm including a first arm 120 and a second arm 122 is slidably and removably attached to the mount 14 by a securement mechanism. Preferably, the first arm 120 is positioned within a recess positioned in the elongated member 20. The first arm 120 has a slot 126 engagable with a threaded pin 128 attached to the elongated member 20 and extending through the slot 126. A handle 130 is threadedly attached to the pin 128 and may be tightened to restrict movement of the first arm 120 or loosened to allow the pin 128 to slide within the slot 126 for sliding the first arm 120 within the recess of the elongated member 20. Lateral movement of the first arm 120 is restricted by the size of the slot 126.

The second arm 122 has a slot 132 and is slidably and removably attached to an extension portion 134 of the first arm 120 by a pin 136 disposed through the slot 132 and having a threaded portion for engagement with a handle 138. The second arm 122 is positioned substantially perpendicular to the first arm 120. Vertical movement of the second arm 122 is restricted by the size of the slot 132.

The second arm 122 has a pivot 140 for enabling a portion 142 of the second arm 122 to pivot away from the mount 14 or tire 16. The pivot 140 includes a slidable pin 144 or other connector mechanism for restricting or allowing pivotal movement of the portion 142 of the second arm 122.

A measuring tool, repair tool, or other tool may be attached to the second arm 122 of the support arm and extend substantially parallel to the first arm 120 for contacting the tire 16. The tools or other mechanisms are removable and interchangeable for enabling several inspection and preparation procedures to be performed on the tire 16 by using the same mount 14.

The first arm 120 may include graduated markings 146 for alignment with a reference marking 148 positioned on the elongated member 20 of the mount 14. The reference markings 146 correspond to various diameters of the tire 16 and provide a starting point for adjusting the position of the first arm 120 so that the measuring tool contacts the tire 16.

As one example of a measuring tool, a wheel assembly includes a contact wheel 150, which is rotatably attached to a bracket 152. The wheel 150 contacts the tire 16 and travels along the surface of the tire as the tire 16 rotates while supported by the mount 14 for measuring the circumference of the tire 16. The bracket 152 is removably attached to the second arm 122 by a connector, such as a pin 154 disposable within a bore of the second arm 122. The pin 154 has a recess 158 engagable with a ball set screw 160 positioned in the bore of the second arm 122.

A pointer arm 164 is attached to the bracket 152 and extends about and above the wheel 150 and has a reference marking 166 positioned at a point 168 of the pointer arm 164 for alignment with a reference marking 170 on the tire 16. The reference marking 170 on the tire 16 may be a tick or line marking printed on a piece of tape, which may be adhesively attached to the tire 16 in a desired location.

An adjustment means, such as a bolt 172 within a slot 174, is attached to the bracket 152 and to the wheel 150 for enabling adjustment of the wheel 150 with respect to the tire 16. At least one spring 176 is positioned contacting the bracket 152 and the wheel 150 for absorbing impact.

An encoder 180 is attached to the wheel 150 for detecting rotation of the wheel 150 about the circumference of the tire 16 and producing signal or signals indicative of the measurement of the circumference of the tire 16. The encoder 180 is electrically connected by wire 182 to a counter 186 for receiving the signals produced by the encoder 180 and determining and displaying the circumference of the tire 16.

The counter 186 is positioned on a support 190, which is attached to a base 192. Preferably, the support 190 positions the counter 186 at substantially the same height as the tire 16 or at a height convenient for a person to visually read the display of the counter 186. The support 190 may be one piece or may include a first portion 194 and a second portion 196 for enabling the support 190 to be taken apart during storage. The dowel pins 198 may be used for connecting together the first and second portions 194 and 196 and the support 190 to the base 192.

The base 192 includes openings 200 for reducing the overall weight of the support 190, and bores 202 for insertion of the leveling pads 90. A shelf may be attached to the support 190 for storage of a battery for supplying power to the counter 186 or for storage of the wheel assembly during non-use.

Referring to FIG. 2, the measuring tools may be connected to a computer 204 and to a printer 206 for providing a printout of the test results of the measuring tools. A sensor 208 may be positioned adjacent to the tire 16 for detecting the reference marking 170 on the tire 16 for providing a starting point and a stop point for determining one revolution of the tire 16.

For the various embodiments of this invention, the same reference characters will be used to designate like parts. In addition, like functions and like interactions of the parts among the various embodiments of this invention will not be repeated for each embodiment.

Alternative embodiments of this invention comprise the tire inspection and preparation device 10 employing various measuring, repairing, and preparation tools. In addition to functioning similarly to the embodiment illustrated in FIGS. 1–3, FIG. 4 illustrates the tire inspection and preparation device 10 employing a dial indicator 210 for contacting the tire 16 to measure and monitor run out of the tire 16.

Figure 4:
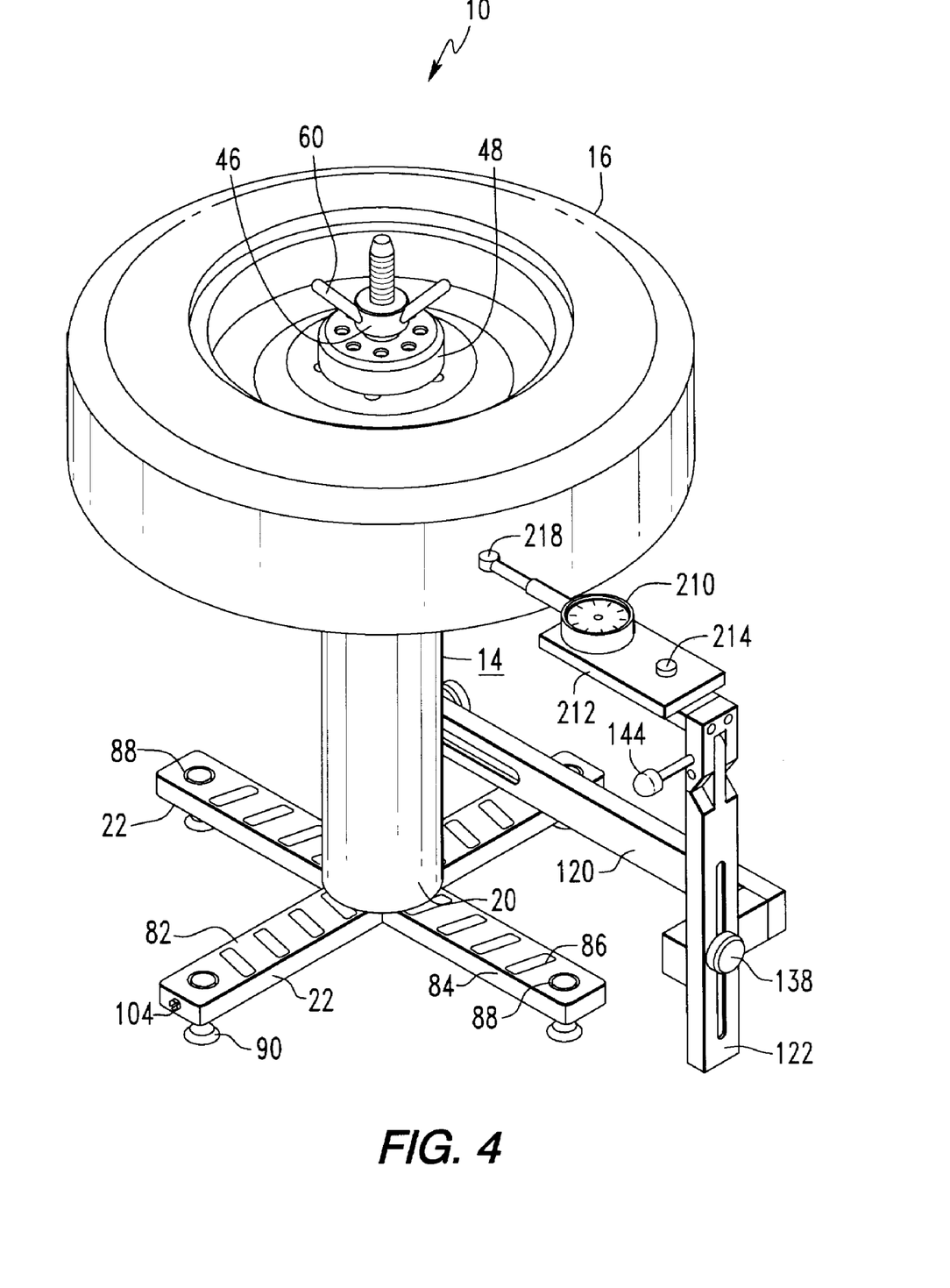
FIG. 4 is an isometric view of the tire inspection and preparation device showing a dial indicator contacting the tire.

The dial indicator 210 is attached to a bracket 212, which is removably attached to the second arm 122 of the support arm by a connector, such as pin 214 inserted through the bore of the second arm 122. The dial indicator 210 includes a wheel 218 which contacts the tire 16 and travels along the surface of the tire as the tire 16 rotates about the mount 14.

Referring to FIGS. 5–8 and using the same reference characters to define like parts, an alternative embodiment of the tire inspection and preparation device 10 as illustrated in FIGS. 1–4 may be a tire inspection and preparation device 240 having like parts as the mount 14 of the tire inspection and preparation device 10 and additionally having a motor assembly coupled to the rotatable member 26 of the mount 14 and a preparation tool attached to the support arm.

Figure 5:
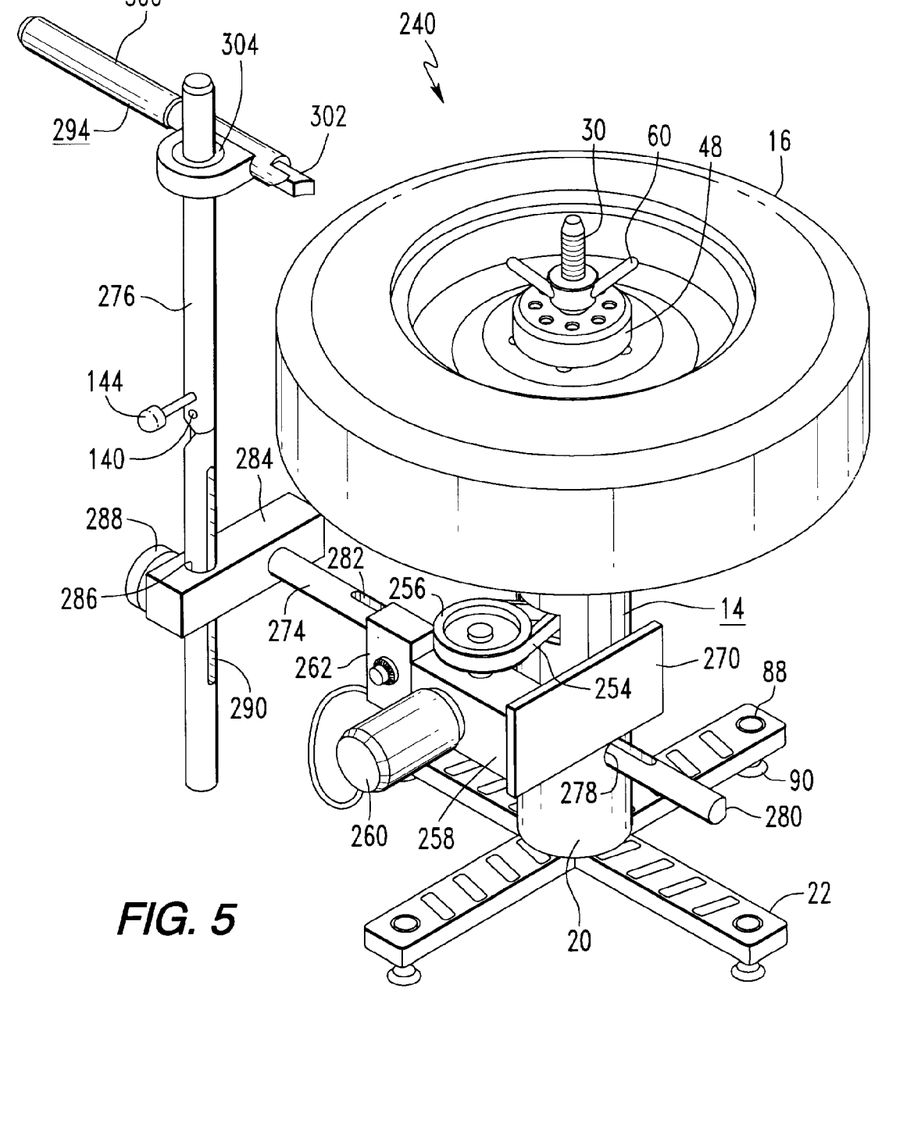
FIG. 5 is an isometric view of an alternative embodiment of the tire inspection and preparation device showing a motor assembly attached to a mount of the tire inspection and preparation device and a cutting tool contacting the tire.
Figure 6:
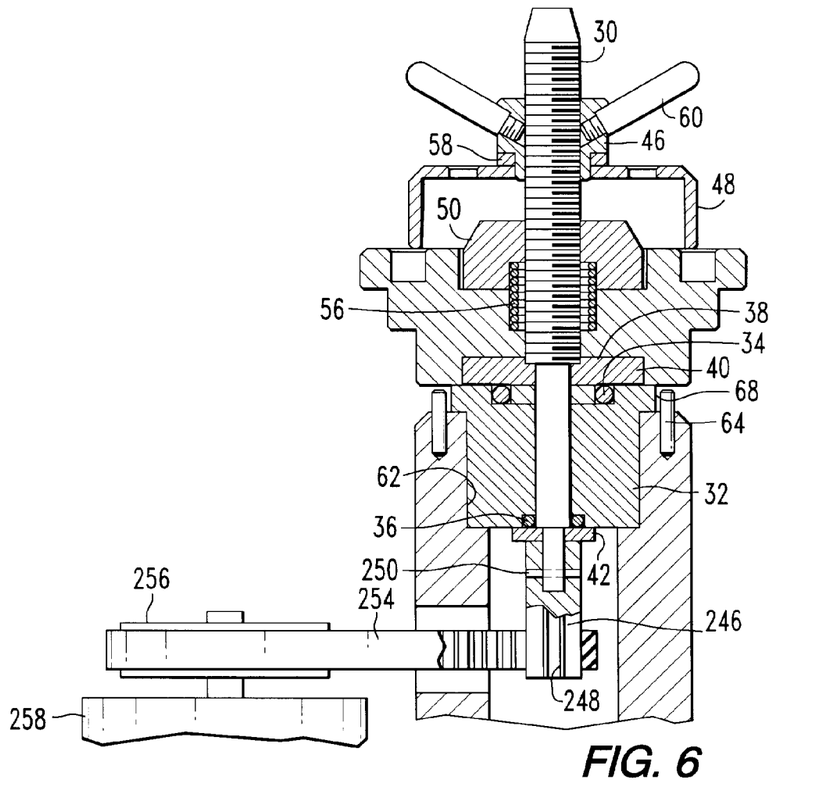
FIG. 6 is a cross-sectional view of the tire inspection and preparation device of FIG. 5.

The threaded shaft 30 extends through the bearing cap 42 and into a shaft 246 with pulley teeth 248. The pulley shaft 246 may be attached to the threaded shaft 30 by a spring pin 250 inserted through the pulley shaft 246 and through the threaded shaft 30.

The motor assembly includes a belt 254 engagable with the pulley teeth 248 of the shaft 246 for automatic rotation of the rotatable member 26. The belt 254, which extends through an opening in the elongated member 20, is coupled to a driver pulley 256, which is attached to a gear reducer 258. The gear reducer 258 is attached to a motor 260, which is electrically connected to a control box 262. The motor assembly is secured to the mount, such as by bracket 270 attached to the elongated member 20. An indicator light may be attached to the on/off switch of the motor for enabling a person to visually determine that power is being supplied to the motor assembly.

As an alternative to the use of first and second arms 120 and 122, a first arm 274 and a second arm 276 having the shape of a rod as compared to the bar shape of the first and second arms 120 and 122 may provide the support arm for the preparation tool. As an alternative to the attachment of the first arm 120 of the support arm to a recess positioned on the outside diameter of the elongated member 20, the first arm 274 may be inserted through a hole 278 in the walls of the elongated member 20 for providing additional stability to the support arm. The hole 278 may be circular for corresponding to a cylindrical shape of the first arm 274, and the hole 278 and the first arm 274 may have a flat 280 for preventing rotational movement of the first arm 274 within the hole 278.

The first arm 274 is adjustably and removably secured to the elongated member 20 by sliding the first arm 274 through the hole 278 and securing the first arm 274 in a fixed position by tightening a handle attached to a threaded pin positioned within a slot 282 in a flat surface of the first arm 274. The second arm 276 is adjustably and removably attached to an extension portion 284 of the first arm 274 by sliding the second arm 276 through a hole 286 in the extension portion 284. The second arm 276 is secured in a fixed position by tightening a handle 288 attached to a threaded pin positioned within a slot 290 in a flat surface of the second arm 276.

Figure 8:
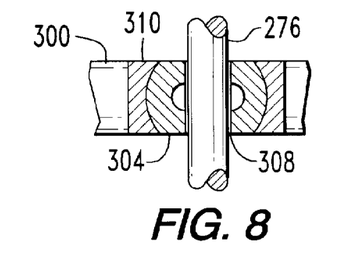
FIG. 8 is a partial cross-sectional view of a pivot bushing.

The preparation tool may be a cleaning tool, such as a cutting tool 294 attached to the second arm 276 for contacting the tire 16 for removing debris from the tire 16 deposited from a race track during racing of an automobile. The cutting tool 294 includes a handle 300, a cutting portion 302, and a pivot bushing 304. The pivot bushing 304, such as a spherical bearing, has a bore 308 sized and adapted to fit on the second arm 276 for enabling lateral rotation of the cutting tool 294 by a person grasping the handle 300. The pivot bushing 304 is contained within a pivot housing 310 for enabling vertical rotation of the cutting tool 294 facilitating adjustment of the cutting tool 294 for access to substantially all surfaces of the tire 16 as the tire rotates within the mount 14. The cutting portion 302 may be an insert which is threaded into a support portion of the cutting tool 294 and retained in position with two socket head cap screws. The cutting portion 302 is removable enabling the cutting edge to be sharpened.

Figure 7:
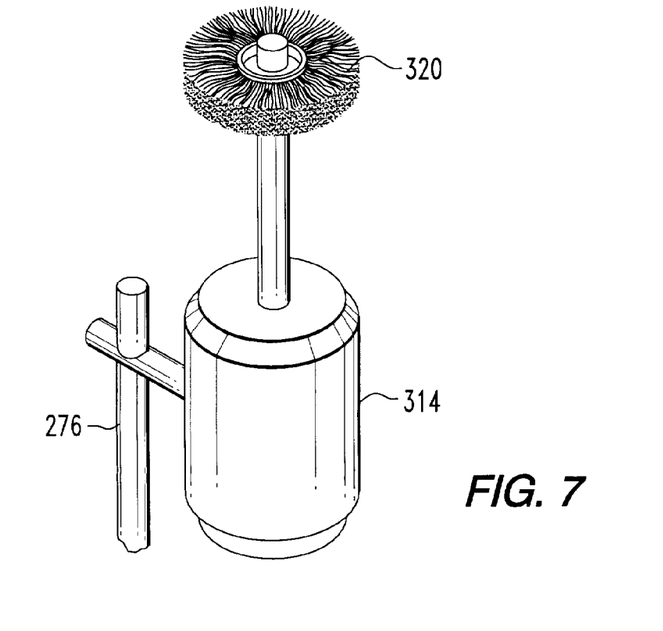
FIG. 7 is a partial isometric view of an alternative embodiment of the tire inspection and preparation device of FIG. 5 showing a motor attached to a scuffing tool.

As an alternative to the attachment of the preparation tool to the second arm 276, the preparation tool may be coupled to a motor 314, which is attached to the second support arm 276 for automatically rotating the tool, eliminating the need for a person to operate the preparation tool. As an example, the preparation tool may be wire wheel 320, emery wheel or other scuffing tool for marking or roughing up the surface of the tire so that the adherence of the tire to the track is improved.

In operation, the leveling pads 90 are disposed in the bores 88 of the base 22 and adjusted for leveling the base 22 with respect to the support surface. The base plug 72 is attached to the base 22 by pin 76. The elongated member 20 is positioned over the base plug 72 and the pins 76 prevent rotation of the elongated member 20 with respect to the base 22.

The bearing housing 32 along with the threaded shaft 30 are positioned within the recess 62 of the elongated member 20 and the pins 64 engage the recesses 68 of the bearing housing 32 for preventing rotation of the bearing housing 32. The threaded shaft 30 rotates within the bearing housing 32.

The tire base 52 is disposed on the threaded shaft 30 and abuts the backplate 40 of the bearing housing 32. The spring 56 is positioned within a recess in the tire base 52 and the tire cone 50 is disposed thereon. The tire 16 is positioned on the tire cone 50 and the cap 48 is positioned on top of the tire 16. The lock nut 46 is tightened onto the cap 48 for securing the tire 16 between the tire cone 50 and the cap 48, and enabling the tire 16 to rotate as a unit with the rotatable member 26.

The handle 60 is loosened for adjusting the position of the first arm 120 to align one of the graduated markings 146 indicative of the diameter of the tire 16 with the reference marking 148 on the elongated member 20 to provide a starting point for aligning the measuring tool in contact with a surface of the tire 16. Tightening of the handle 60 secures the position of the first arm 120 in the desired location The handle 130 is loosened for adjusting the position of the second arm 122 to alter the height of the measuring tool with respect to the tire 16.

Alternatively, the handles are manipulated to adjust the first and second arms 274 and 276 for aligning the cutting tool 294 or wire wheel 320 with the tire 16.

The desired measuring tool or preparation tool, such as the contact wheel 150 or dial indicator 210, is attached to the second arm 122. For use of the contact wheel 150, the wire 182 is connected to the counter 186. For use of the cutting tool 294 or wire wheel 320, the belt 254 is coupled to the shaft 246 and the motor assembly is attached to the elongated member 20.

An advantage of the tire inspection and preparation device 10 or 240 is that it is a self contained apparatus eliminating the need for additional supports or rotation means. The tire inspection and preparation device 10 or 240 can conveniently be used at a race track or other location.

Another advantage is that the components of the tire inspection and preparation device 10 or 240 can be disassembled and easily and compactly transported or stored. The components could be placed in a storage case.

By using the contact wheel 150, the encoder 180, and the counter 186, the tire inspection and preparation device 10 accurately measures the circumference of the tire 10. The circumference can be read from the counter 186 or the run out can be monitored with the dial indicator 210. The leveling pads used to adjust the position of the tire for substantially balancing and leveling the tire enables accurate measurements to be read.

By automatically rotating the tire 16, the time to clean or scuff the tire 16 is reduced and the quality of the repair is improved. Automatic operation of the preparation tool improves the efficiency of the tire inspection and preparation device.

Thus there has been shown and described a novel tire inspection and preparation device which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

What is claimed is:

1. A tire inspection and preparation device, comprising:
    a base positioned on a support surface;
    a cylindrical elongated member removably attached to said base and having a bore at least partially therethrough, said cylindrical elongated member positioned extending substantially perpendicular to said support surface and having an axis therethrough extending to said base for supporting a tire in spaced apart relation to said support surface;
    a rotatable member disposed within said bore of said elongated member and rotatably attached to said elongated member for enabling said rotatable member to rotate while said elongated member remains stationary, said tire disposed on said rotatable member for rotating said tire about an axis extending perpendicular to said support surface, said axis of rotation of said tire coinciding with said axis of said cylindrical elongated member;
    a fastener coupled to said rotatable member for securing said tire between said elongated member and said fastener;
    a first arm adjustably attached to said elongated member and extending substantially perpendicular to said elongated member;
    a second arm adjustably attached to said first arm and extending substantially perpendicular to said first arm and substantially parallel to said elongated member; and
    at least one tool interchangeably attached to said second arm and contacting a treaded surface of said tire while said tire is supported by said tire inspection and preparation device for performing various procedures on said tire.

2. The tire inspection and preparation device according to claim 1, further comprising:
    said tire having a reference marking;
    said tool including,
        a bracket attached to said second arm and having a reference marking for alignment with said reference marking on said tire for determining a revolution of said tire;
        a wheel rotatably attached to said bracket for contacting said tire;
        an encoder attached to said wheel for measuring rotation of said wheel and producing a signal; and
    a counter electrically connected to said encoder for receiving said signal from said encoder and determining a circumference of said tire.

3. The tire inspection and preparation device according to claim 1, wherein said tool includes a dial indicator for contacting said tire for measuring run out of said tire.

4. The tire inspection and preparation device according to claim 1, wherein said tool is a cutting tool for cleaning debris from said tire.

5. The tire inspection and preparation device according to claim 4, further comprising a motor coupled to said elongated member for automatically rotating said tire.

6. The tire inspection and preparation device according to claim 4, wherein said cutting tool has a pivot bushing for enabling a person to rotate said cutting tool vertically and has a bore for engagement with said second arm for enabling a person to rotate said cutting tool laterally.

7. The tire inspection and preparation device according to claim 1, further comprising
    a plurality of leveling pads adjustably secured to said base for altering a position of said tire with respect to the support surface for positioning said tire in a substantially level position.

8. The tire inspection and preparation device according to claim 1, wherein said second arm has a pivot for pivoting a portion of said second arm to move said tool away from said tire.

9. The tire inspection and preparation device according to claim 1, wherein said tire includes a first side and a second side, further comprising:
    a tire base positioned on said first side of said tire;
    a cap positioned on said second side of said tire for positioning said tire between said tire base and said cap during rotation of said tire;
    said fastener coupled to said tire base and said cap for securing said tire to said tire inspection and preparation device; and
    said elongated member extending between said tire base and said support surface.

10. The tire inspection and preparation device according to claim 1, wherein said tool is a scuffing tool for marking said tire.

11. The tire inspection and preparation device according to claim 1, further comprising a motor attached to said tool and to said second arm for automatically rotating said tool.

12. The tire inspection and preparation device according to claim 1, further comprising:

a computer coupled to said tool; and a printer connected to said computer for producing a printout displaying test results.

13. The tire inspection and preparation device according to claim 2, further comprising a sensor positioned adjacent to said elongated member for detecting said reference marking on said tire for indicating a full revolution of said tire.

14. The tire inspection and preparation device according to claim 1, wherein said first arm includes graduated markings corresponding to a diameter of said tire for providing a starting reference point for positioning of said tool with respect to said tire.

15. A tire inspection and preparation device, comprising:

a mount having an elongated member for supporting a tire in spaced apart relation to a support surface, having a rotatable member rotatably attached to said elongated member for rotating said tire about an axis, and having a fastener coupled to said rotatable member for securing said tire to said mount;

a support arm adjustably attached to said mount and extending therefrom;

at least one interchangeable tool attached to said support arm for performing various procedures on said tire; and said support arm including graduated markings corresponding to a diameter of said tire for providing a starting reference point for positioning of said tool with respect to said tire.

16. The tire inspection and preparation device according to claim 15, further comprising a dial indicator attached to said support arm for contacting said tire for measuring run out of said tire.

17. The tire inspection and preparation device according to claim 15, further comprising:

a reference marking positioned on said tire;

a wheel assembly, removably attached to said support arm, having a rotatable contact wheel for contacting said tire and having a reference marking for alignment with said reference marking on said tire for determining a revolution of said tire;

an encoder attached to said contact wheel for measuring rotation of said contact wheel during said revolution of said tire and producing a signal; and a counter connected to said encoder for receiving said signal from said encoder and determining a circumference of said tire.

18. The tire inspection and preparation device according to claim 15, further comprising a printer connected to said counter for producing a printout indicating inspection and preparation results.

19. A tire inspection and preparation device, comprising:

a mount having a cylindrical elongated member extending substantially perpendicular to a support surface and having an axis therethrough extending to said support surface for supporting a tire in spaced apart relation to said support surface, having a rotatable member rotatably attached to said cylindrical elongated member for rotating said tire about an axis extending substantially perpendicular to said support surface, said axis of rotation of said tire coinciding with said axis of said cylindrical elongated members and having a fastener threadedly attached to said rotatable member for securing said tire to said mount;

a first arm adjustably attached to said mount and extending substantially perpendicular to said elongated member and parallel to said support surface;

a second arm adjustably attached to said first arm and extending substantially perpendicular to said first arm and to said support surface and extending substantially parallel to said elongated member; and at least one interchangeable tool attached to said second arm for performing various procedures on said tire.

20. The tire inspection and preparation device according to claim 19, further comprising a motor coupled to said rotatable member of said mount for automatically rotating said tire.

* * * * *